BEST AVAILABLE COPY
C. W. SQUIRES.
CIRCUIT CONTROLLING MECHANISM FOR ELECTRIC RAILWAY SWITCHES.
APPLICATION FILED JULY 25, 1911.
1,080,730.
Patented Dec. 9, 1913.
6 SHEETS—SHEET 1.
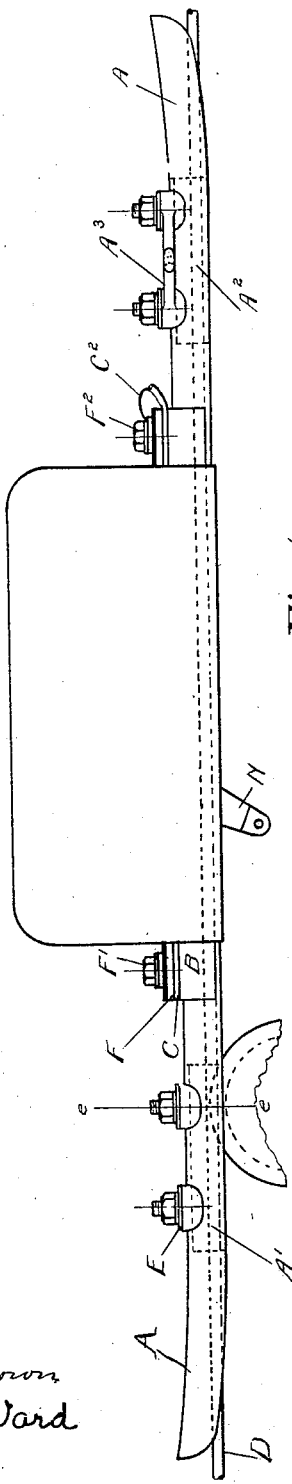
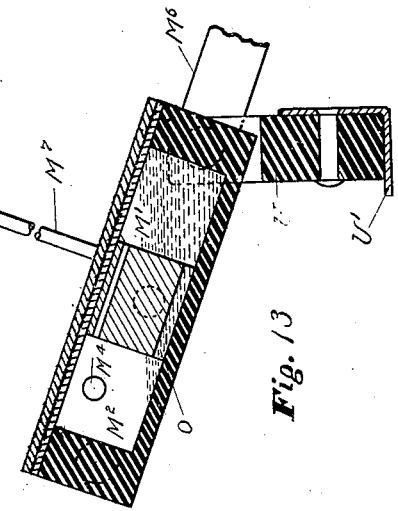
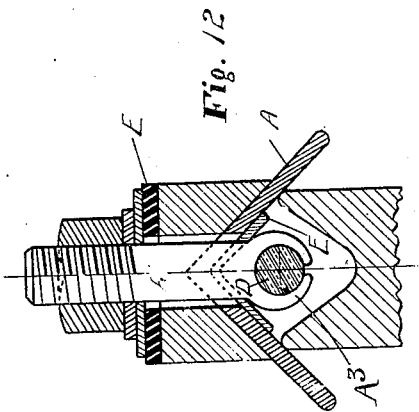
WITNESSES:
Louis M. Brown
Eva M. Ward
INVENTOR.
Charles W. Squires C. W. SQUIRES.
CIRCUIT CONTROLLING MECHANISM FOR ELECTRIC RAILWAY SWITCHES.
APPLICATION FILED JULY 25, 1911.
1,080,730.
Patented Dec. 9, 1913.
6 SHEETS—SHEET 2.
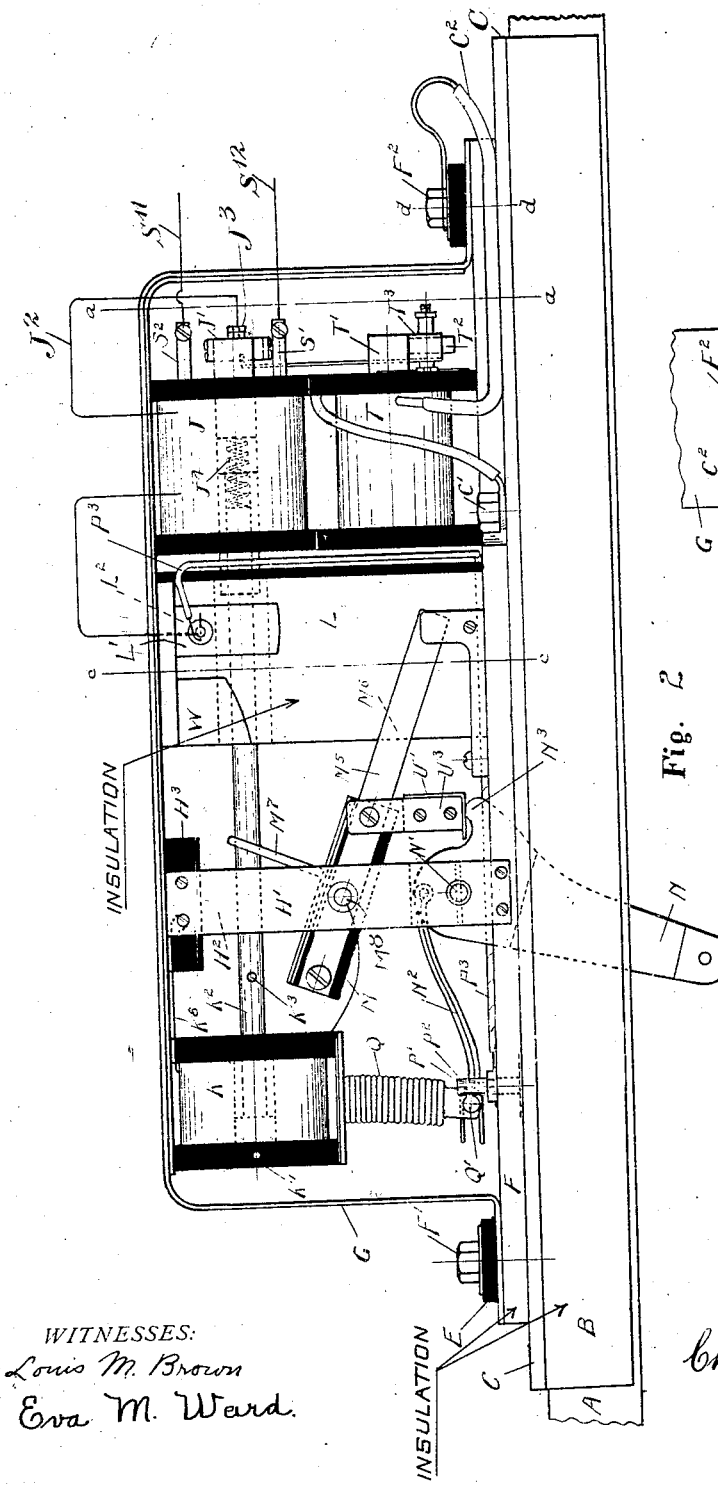
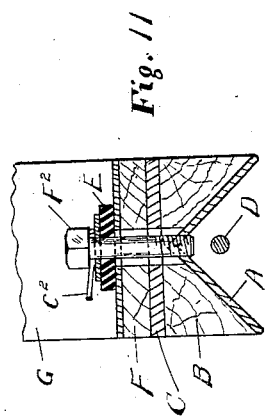
WITNESSES:
Louis M. Brown
Eva M. Ward.
INVENTOR.
Charles W. Squires

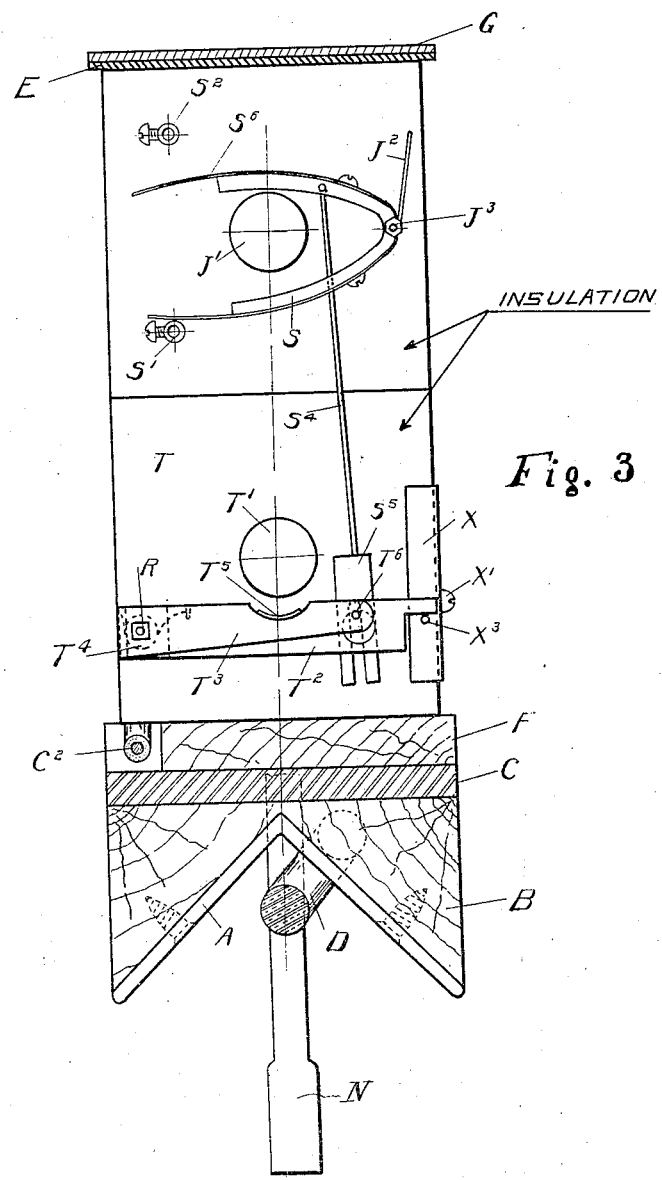

C. W. SQUIRES.
CIRCUIT CONTROLLING MECHANISM FOR ELECTRIC RAILWAY SWITCHES.
APPLICATION FILED JULY 25, 1911.

1,080,730.

Patented Dec. 9, 1913.
6 SHEETS—SHEET 4.

WITNESSES:
Louis M. Brown
Eva M. Ward.

INVENTOR.
Charles W. Squires

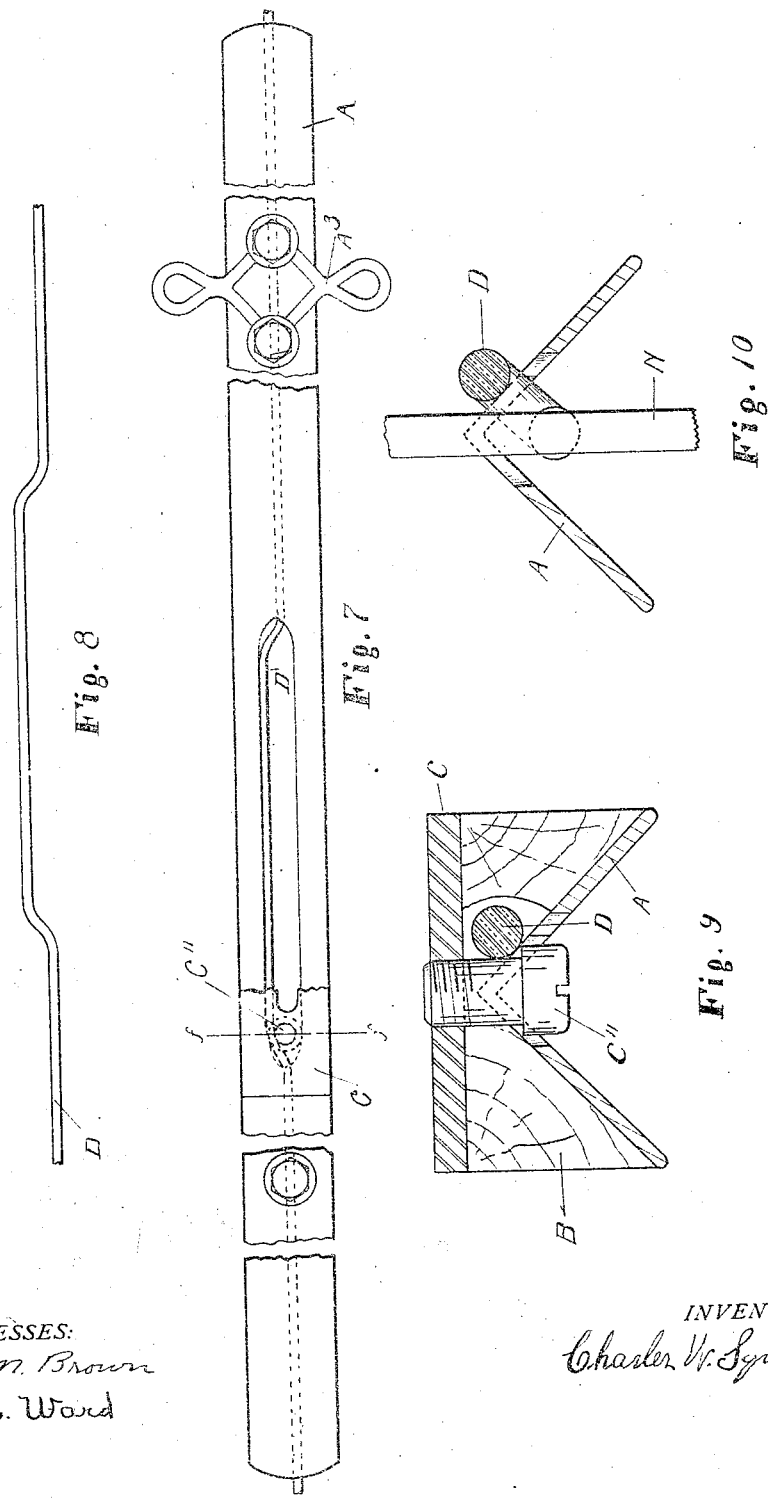

UNITED STATES PATENT OFFICE.

CHARLES W. SQUIRES, OF BEVERLY, MASSACHUSETTS.

CIRCUIT-CONTROLLING MECHANISM FOR ELECTRIC-RAILWAY SWITCHES.

1,080,730.

Specification of Letters Patent. Patented Dec. 9, 1913.

Application filed July 25, 1911. Serial No. 640,521.

*To all whom it may concern:*

Be it known that I, CHARLES WILLIAM SQUIRES, a citizen of the United States, residing at Beverly, in the county of Essex and State of Massachusetts, have invented new and useful Improvements in Circuit-Controlling Mechanisms for Electric-Railway Switches, of which the following is a specification.

My invention relates to that class of mechanism used in connection with the trolley wire for controlling the circuits of electrically operated track switches by the person operating the car, and the objects of my improvements are, first, to provide a more reliable method of operation, second, to simplify the work of installation, and third, to reduce cost of maintenance. I attain these objects by the mechanism illustrated in the accompanying drawings, in which—

Figure 4:
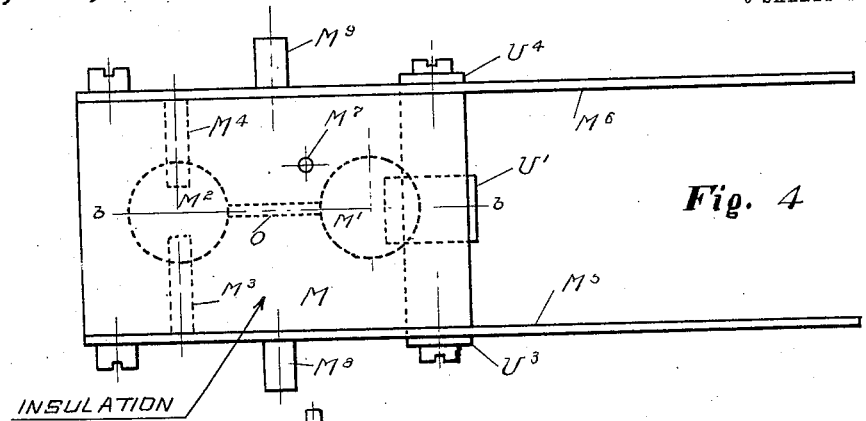
Figure 5:
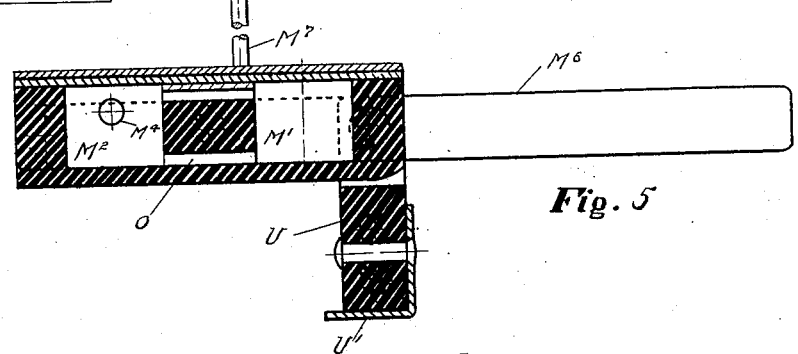
Figure 6:
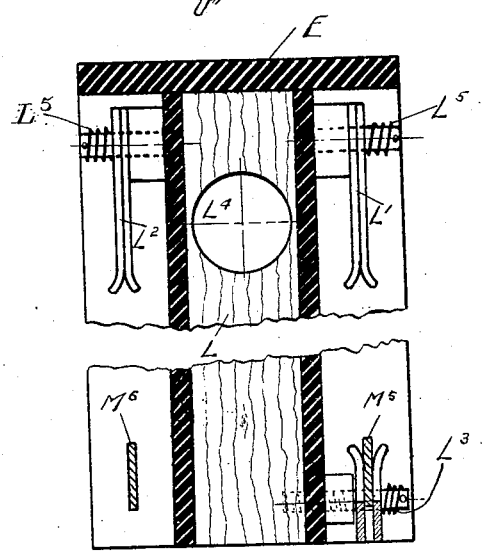
Figure 14:
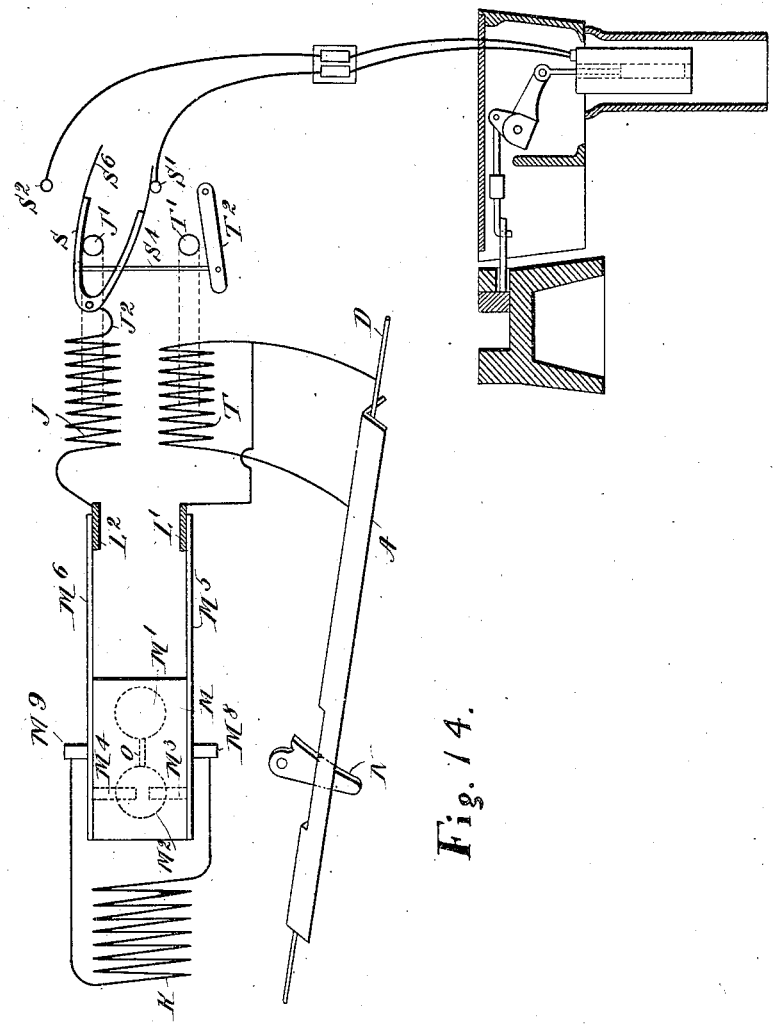

Figure 1, is a side view of the device as it appears on the trolley wire. Fig. 2, is an enlarged side view of the operable portion of the device with cover removed. Fig. 3, is a sectional view on lines $a$, $a$, Fig. 2. Fig. 4, is a plan view of the contact carriage M. Fig. 5, is a sectional view on lines $b$, $b$, Fig. 4. Fig. 6, is a sectional view of the contact block L, on line $c$, $c$, Fig. 2. Fig. 7, is a top view of the base in its relation to the trolley wire, with part of the base plate C, and the wood block B, cut away, also showing a section of the actuating lever N. Fig. 8, is a section of the trolley wire properly shaped for attachment to the rail. Fig. 9, is a detailed section of the base, on lines $f$, $f$, Fig. 7, combined with the trolley wire. Fig. 10, is a sectional view on lines $g$, $g$, Fig. 7. Fig. 11, is a detailed sectional view on lines $d$, $d$, Fig. 2. Fig. 12, is a detailed sectional view on lines $e$, $e$, Fig. 1. Fig. 13, is a sectional view of contact carriage in its normally inclined position on lines $b$, $b$, Fig. 4. Fig. 14 is a diagrammatic view showing the various circuits.

Similar letters refer to similar parts throughout the several views.

A is a rail shaped in cross section like an inverted V. On its upper side it is faced with two wooden blocks B the upper surfaces of which form a flat support or platform for the plate C and the operating mechanism, the blocks serving to insulate the plate C from the rail A. The rail and the parts supported thereby are secured to the trolley wire D by clench ears $A^1$, $A^2$ which partly surround the trolley wire and carry threaded pins which pass up through holes in the rail A and are clamped by nuts on their upper ends. Insulating material E is placed to insulate the clench ears from the rail A and plate C. The pins holding the clench ear $A^2$ also confine the retaining clip $A^3$ to serve as additional means for holding the device on the trolley wire.

The rail A is cut away for a portion of its length in the center as shown in Figs. 7 and 9 to allow the operating lever N to pass down through it and be easily operated, and the trolley wire D is bent as shown in Figs. 7 to 10 so that it will pass to one side of the opening in the rail A, the trolley wire D being held in place by screws $C^{11}$ against the plate C so that the plate C becomes part of the main circuit.

On the plate C is mounted the base board F made of wood or other insulating material and on it are mounted two standards $H^1$, $H^2$ opposite each other and each attached at its upper end to a block $H^3$ of fiber or a like insulator. These parts together with the bent metal strip G form the frame of the device, the ends of the part G being secured to the base by cap screws $F^1$, $F^2$ which are insulated from the part G by suitable insulation E. Within the frame thus formed are secured three electro-magnets, viz: the car circuit magnet T, the circuit locking magnet J and the carriage returning magnet K.

L is a block of insulating material which carries two terminals $L^1$, $L^2$ one on each side thereof near its upper edge. Preferably the block is made of wood with slate sides to which the terminals are attached. The terminal $L^1$ is electrically connected with the plate C by means of the wire P and the stud $P^2$ to which it is attached and which is connected electrically by the cross arm $Q^1$ to the stud $P^1$ which is in electrical contact with the plate C. The terminal $L^2$ is electrically connected with the circuit locking magnet J which in turn is connected by wire $J^2$ with the pivot stud $J^3$ of switch member S.

The switch member constitutes an auxiliary armature to the core $J^1$ of the circuit locking magnet J. It is made of iron for magnetic attraction and is forked carrying a spring copper strip which is sufficiently long to make electric contact with either one of two binding posts $S^1$ and $S^2$ according to the position of the switch member S. Each binding post is connected by a conductor (not shown) with one of the elements of a track mechanism, by which the track switch is thrown.

The normal position of the switch member S is shown in Fig. 3 which position it normally maintains by gravity. It is lifted when necessary by the armature $T^2$ of car circuit magnet T. For this purpose it is connected to said armature by the connecting rod $S^4$ which carries at its lower end a forked fiber tip $S^5$ which rests on a horizontal pin $T^6$. This pin projects from an arm $T^3$ which with the armature $T^2$ is pivoted at R, to the support for the front end of the coil T. The aperture in the armature $T^2$ through which the pin $T^6$ projects is sufficiently large to allow the arm $T^3$ a slight movement independent of the armature $T^2$ and a spring $T^4$ is provided to hold the pin $T^6$ normally against the upper edge of the opening in the armature. This construction allows the switch and the armature $T^2$ to have a slight movement independent of each other. The drop of the armature is controlled and may be adjusted by means of an adjustable clip X carrying a stud $X^3$ against which the end of the armature rests when the coil T is cut out of circuit so that the armature and hence the switch S will only be moved if the amperage is above a certain figure. One end of the coil T is connected to the binding screw $C^1$ which is in electrical contact with the plate C. The other end of the coil T is connected by the wire $C^2$ to the binding screw $F^2$ by which it is electrically connected with the rail A.

M is the contact carriage which is pivoted between the standards $H^1$, $H^2$. It carries an abutment arm U comprising a fiber or insulating body pivotally supported from the contact carriage M by metallic hinge straps $U^3$, $U^4$. It is shod by a metal plate $U^1$ and lies normally because of the position of its pivots, in the path of the projection $N^3$ on the actuating lever N. The actuating lever N is pivoted at $N^1$ between the standards $H^1$, $H^2$ and hangs down through the slot in the rail A, being held in nearly vertical position by the spring $N^2$ the farther end of which is attached to the lower end of a spring arm Q secured to the base of the carriage returning magnet K. By this means the actuating lever is not only enabled to yield with sufficient freedom, but also at the proper time moves the cross arm $Q^1$. The cross arm $Q^1$ and spring $N^2$ may be omitted in which case the wire $P^3$ will be directly connected to the plate C and the lever N will return to its normal position by gravity. The lever N is operated by the trolley wheel as it passes along out of contact with the trolley wire D but in contact with the rail A. The contact carriage M is pivotally mounted on trunnions $M^8$, $M^9$ supported in the standards $H^1$, $H^2$. It comprises as shown two cells $M^1$, $M^2$ connected by passages O and partially filled with mercury or other liquid conductor adapted to flow from one chamber to the other according to the slant of the carriage. It also has two arms $M^5$, $M^6$ which form its sides, the ends of these arms projecting from the front of the carriage. Two oppositely-positioned conductor studs $M^3$, $M^4$ connected to the arms $M^5$, $M^6$ project into the chamber $M^2$, their inner ends being out of contact. The amount of mercury or other fluid conductor used should be sufficient to close the circuit through those studs $M^3$, $M^4$ when the rear of the carriage is depressed so that the fluid will flow from the chamber $M^1$ to chamber $M^2$. When the carriage returns to its normal position the fluid conductor will flow back to cell $M^1$.

Each pair of terminals $L^1$ and $L^2$ is mounted on a stud and the members of each pair are pressed together by a spring $L^5$ located on the outer end of the stud and between the outer terminal and a suitable pin (see Fig. 6). These terminals are so located with relation to the arms $M^5$, $M^6$ that when the contact carriage is rocked by the actuating lever N each arm $M^5$, $M^6$ will be thrown between the members of one of the terminals. The fluid which up to this moment has been in the chamber $M^1$ will flow down into chamber $M^2$ and connect electrically the studs $M^3$, $M^4$ thus shunting the coil K and maintaining the electrical connection between the terminals $L^1$ and $L^2$.

To return the carriage M to its original position I provide a plunger rod $K^2$ the ends of which form the armatures of coils J and K acting as solenoids. Each coil J, K has a fixed core $J^1$, $K^1$ which, however, passes only partially into the opening in the coil and the rod $K^2$ carries a spring $J^4$ at its forward end, the length of the rod K and its spring being sufficient to reach from the inner end of core $K^1$ to the inner end of core $J^1$ against which the spring $J^4$ on the rod $K^2$ rests. The rod $K^2$ carries a pin $K^3$ and the carriage M carries a shifting arm $M^7$ projecting from its upper side, these two parts being so located that when the carriage is in its tilted or operative position the attracting of the rod $K^2$ by current in the coil J will cause the pin $K^3$ to engage the arm $M^7$ and throw the carriage down into its normal or inoperative position. To prevent the carriage from rebounding I prefer to provide a retaining device which as shown is similar in construction to one of the terminals L¹, L² comprising two plates held together by a compression spring L³ which will grip the arm M⁵ of the carriage and hold it against a rebound until the carriage is operated again by the actuating lever N.

The operation of this device is as follows: The plate C is always in electrical contact with the trolley wire and one end of the coil T is also electrically connected with the plate C at the binding screw C¹. The other end of the coil T is electrically connected by wire C² with binding screw F² and the rail A. Thus the coil T is dormant unless a car, the trolley of which is running on the rail A, is drawing current from the trolley wire, in which case the current must pass through the coil T as it is part of the only electrical connection between the trolley wire D and the plate A. Gravity holds the switch S in its normal position in engagement with the stud S¹ as shown in Fig. 3. When the trolley wheel throws the actuating lever N the contact carriage is tilted so that its arms M⁵, M⁶ engage the terminals L¹, L². If at this moment power is shut off from the car, no current passes through T and the switch S remains in the position shown in Fig. 3. The current passes from the trolley wire D through plate C by the stud P¹, a cross arm Q¹, stud P² and wire P³ to the terminal L¹. Thence it passes through the arm M⁵, standard H¹, coil K, standard H², arm M⁶, terminal L² to coil J, wire J² and stud J³ to the binding post S¹ and the proper member of the track instrument. When the contact carriage M is tilted the fluid conductor begins to flow from cell M¹ to M² and when cell M² contains sufficient fluid to close the circuit through M³ and M⁴ there is a short circuit which cuts out coil K and renders the coil J efficient to draw the rod K² forward and cause its stud K³ to engage the shifting arm M⁷ on the contact carriage and return the carriage to its normal position, thus breaking the circuit at the terminals L¹, L² so that the coil J is thrown out of circuit. The spring J⁴ on the end of the plunger rod K² then returns to its former position, and the instrument having done its work becomes dead until the next car operates the lever N. If on the other hand the circuit is closed through the car the car gets its current from the trolley wire D through plate C, binding screw C¹, coil T, wire C², binding screw F², rail A and trolley wheel, etc. The armature T² is then attracted and the switch S is thrown to make contact with the binding post S². When the lever N is thrown the circuit made is through the contact carriage as before, but the current instead of passing through the switch S to the binding post S¹ passes to the binding post S² and from it to the other track instrument to throw the track switch in the opposite direction and thus change the direction of the car. The contact carriage is then thrown back breaking the instrument circuit and the switch resumes its former position by gravity.

It is evident that other arrangements for accomplishing the same results will occur to those skilled in the art, so that I do not mean to limit myself to the precise construction shown although it is simple and has proved satisfactory in practice. The short-circuiting of the coil K after the contact carriage has tilted for example, may be accomplished by other means than by mercury without departing from my invention and the lever N may be allowed to fall by gravity without the use of a spring.

It will be noticed that the magnet J not only serves to operate the plunger rod K² at the proper time, but also holds the switch S positively against either post S¹ or S² according to whether or not current is passing through the magnet T. I have used the term "main circuit" to indicate the contact carriage and the parts electrically connected therewith.

Having thus described my improvements, what I claim as new and desire to secure by Letters Patent is:

1. A track switch operating mechanism comprising a main circuit, a circuit locking magnet, two track switch connections and a switch member operable to connect either of the two track switch connections with the main circuit, means operable by said circuit locking magnet while energized to hold said switch member in fixed position, a car circuit, a magnet comprised therein, and an operable connection between said car circuit magnet and the switch member of the track switch operating circuit whereby said switch member may be moved, substantially as described.

2. A track switch operating mechanism in which is comprised a main circuit, a circuit locking magnet, two track switch connections and a switch member operable to connect the main circuit with either of the two track switch connections, means operable by the said circuit locking magnet when energized to hold said switch member in fixed position during the passage of current through either of the track switch connections, a car circuit magnet connectible to the car and adapted to be energized when the circuit through the car is closed, an armature therefor and a connection between said armature and said switch member adapted to throw said switch member from one to the other of the track switch connections, substantially as described.

3. In a track switch mechanism, a normally open circuit, a contact member, a trolley actuated member adapted to impart movement to said contact member to effect the closing of said normally open circuit, an electro-magnet in said normally open circuit and an armature operable by said magnet and adapted to cause said contact member to again open the normally open circuit, a second electro-magnet comprised in said normally open circuit, adapted when energized to prevent movement of the said armature, automatic means adapted to be operated by the movement of said contact member to effect the shunting of said second magnet within a predetermined time limit, substantially as described.

4. A trolley wire, a circuit controlling device supported thereon, comprising a normally open circuit, a contact member, an actuating lever suitably supported and operable by the trolley wheel of a passing car to move said contact member whereby it will close said normally open circuit, an electro-magnet comprised in a track switch operating circuit, automatic means operable with said contact member to shunt said magnet coil, and means adapted to operate said contact member to reopen said normally open circuit, substantially as set forth.

5. In a mechanism of the kind described, the combination of a normally open circuit, a trolley operated contact member adapted to close said circuit, an electro-magnet comprised in the normally open circuit, and means comprising an armature adapted to be operated by said magnet whereby the energization of said magnet will cause the opening of the normally open circuit.

6. In a mechanism of the kind described, a main circuit, two track switch connections, a switch member operable to connect the main circuit with either of the track switch connections, a car operating circuit, a car circuit magnet comprised therein, an armature for said car circuit magnet, a connection between said armature and the said switch member whereby said armature when attracted will operate said switch member, and means adapted to adjust the unattracted position of the armature whereby the movement of said armature of the car circuit magnet is limited to occur only at a predetermined amperage.

7. In a mechanism of the kind described, a normally open circuit, a contact member, means operable by the trolley wheel of a car to move said contact member to effect the closing of said circuit, an electro-magnet comprised in said circuit, and means operable by said magnet to effect the movement of said contact member to again open the normally open circuit.

8. In a mechanism of the kind described, a normally open circuit, a member adapted to close said circuit, means for causing it to close said circuit operable by the moving car, two electro-magnets comprised in said circuit, said magnets being adapted to coöperate with each other to operate said contact member to open said circuit after the same has been closed through the action of the trolley wheel of a passing car.

9. In a mechanism of the kind described, in combination with a circuit-controlling device, a main circuit, two track switch connections, a switch member operable to connect the main circuit with either of the track switch connections, an electro-magnet adapted when energized to hold said switch member in one position, a car-operable circuit, an electro-magnet comprised therein, an armature therefor, and a yielding connection between said armature and said switch member whereby the attraction of said armature will operate said switch member only when said first-named electro-magnet is not energized.

10. In a mechanism of the kind described, a normally open circuit, a contact member adapted to close and open said circuit, an electro-magnet comprised in said circuit, means actuated by the trolley wheel of a passing car whereby the said contact member is moved to close the normally open circuit, and means operable to shunt said electro-magnet to effect the movement of the said contact member.

11. In a mechanism of the kind described, a normally open circuit, a contact member, means operable by the trolley wheel of a car to effect the movement of said contact member to close said normally open circuit, an electro-magnet comprised in said normally open circuit, means operable by the said electro-magnet to effect the return of said contact member to its normal position, a second electro-magnet comprised in said normally open circuit adapted when energized to delay the action of said first mentioned electro-magnet in effecting the return of said contact member to its normal position, a pair of normally disconnected terminals, operable when connected to effect the shunting of the second mentioned electro-magnet, and gravity acting means coöperable with the said contact member to connect said terminals.

12. A main circuit, two track switch connections, a switch member adapted to connect said main circuit with either of the two track switch connections, an electro-magnet comprised in said main circuit, said electromagnet being operable to retain said switch member in fixed position during a passage of current through its coils, a car circuit, an electro-magnet comprised therein, and yielding means operable by said last named electro-magnet to reverse the position of said switch member whereby current may be supplied to either of the two track switch connections, substantially as set forth.

13. A normally open circuit, two track switch connections, a switch member adapted to connect the main circuit with either of the two track switch connections, an electro-magnet comprised in said main circuit, said electro-magnet being operable to maintain said switch member in fixed position during a passage of current through its coils, a contact member and mechanical means operable by the trolley wheel of a passing car whereby said contact member is moved to close said normally open main circuit.

14. In a circuit controlling mechanism, in combination, a normally open electric circuit, a contact member, means adapted to be operated by the trolley wheel of a passing car to cause it to close said circuit, an electromagnet comprised in said normally open circuit, and operable connections whereby the said contact member will automatically open said normally open electric circuit, when closed, substantially as described.

15. A circuit controlling device adapted to be operated by the trolley wheel of a car, comprising a metal rail having a central longitudinal slot therein, a metal plate supported by said metal rail, said metal plate also being provided with a slot registering with the slot in said rail, a trolley operated actuating lever, adapted to hang centrally with the rail through said slots, a trolley wire, means whereby the trolley wire may be secured to the said metal plate out of line with said slots, and means operable by said lever comprising an electric circuit, and switch mechanisms operable thereby whereby a track switch may be operated.

16. In a switch controlling device, an electro-magnet, an adjustable armature, a spring arm adapted to move therewith and have a motion in relation thereto, and a switch member connected to said arm whereby said switch member may be moved to close a circuit by said armature irrespective of the length of movement of said armature.

17. In combination, a car-operated circuit, an electro-magnet comprised therein, an armature for said electro-magnet, a main switch-operating circuit, an electro-magnet therein, two track switch connections, a switch member operable to divert the current from the main to either of said track switch connections and adapted to be held in one position by said last-named electromagnet when energized, and yielding means of mechanical connection between said armature and said switch member whereby when said last-named electro-magnet is energized to hold said switch member, said armature may be attracted without moving said switch member, but when said electro-magnet is not energized the movement of said armature will move said switch member.

18. The combination of a car operated circuit, an electro-magnet comprised in said circuit, an armature for said magnet, a main switch operating circuit, two track switch connections, a switch member operable to divert the current from the main to one of said branch circuits, yielding means of connection between the said armature and the said switch member whereby said switch member may be moved to connect said main circuit with either track switch connection, and adjustable means to limit the movement of said armature whereby said armature may be set to operate at a predetermined amperage applied through the car operated circuit for the operation of a track switch.

19. A track switch mechanism comprising a rail, a trolley wire insulated therefrom, a plate mounted on said rail and insulated therefrom connected to said trolley wire, a car circuit magnet connected at one end to said plate and at the other to said rail, a switch operating mechanism mounted on said plate operable by said car circuit magnet, and an electric switch operated by said car circuit magnet, and means for electrically connecting said rail and said trolley wire whereby when the circuit is closed through the car the current will pass from said trolley wire through said magnet and said rail and said switch will be thrown.

20. A section of angle iron adaptable to be supported on the trolley wire, said angle iron providing a runway for the trolley wheel of a passing car, a metal plate supported by, but electrically insulated from said angle iron, a longitudinal opening in said angle iron, said opening being suitable to allow of the trolley wire being bent upward for attachment to said metal plate, and means for securing the trolley wire to said metal plate, substantially as described.

21. In a device of the kind described, in combination with a switch operating circuit and a magnet comprised therein, a gravity acting switching member adapted to shunt the current of said magnet to effect the opening of the switch operating circuit, substantially as set forth.

22. In a mechanism of the kind described, a car circuit magnet, a normally open switch-operating circuit, a trolley-operated switch member adapted to close said normally open circuit, and automatic means operable with said switch member to cause the return of said switch member to its normal position.

23. In a mechanism of the kind described, a car circuit magnet, an armature therefor, a normally open main circuit, two switch-operating circuits, a switch member operable to connect the main circuit with either of the two switch-operating circuits, an operable connection between the armature of the car circuit magnet and the said switch member, a trolley-operated switch member adapted to close said normally open circuit, and automatic means operable with said trolley-operated switch member to cause the return of said switch member to its normal position within a predetermined length of time, substantially as set forth.

CHARLES W. SQUIRES.

Witnesses:
 Louis M. Brown,
 Eva M. Ward.